United States Patent
Phillips et al.

[11] Patent Number: 5,471,491
[45] Date of Patent: Nov. 28, 1995

[54] METHOD AND STRUCTURE FOR IMPINGEMENT COOLING A LASER ROD

[75] Inventors: Peter E. Phillips, Redondo Beach; Landon A. Strattan, Playa Del Ray; Vikram D. Desai, Lake Forest, all of Calif.

[73] Assignee: Hughes Aircraft Company, Los Angeles, Calif.

[21] Appl. No.: 339,616

[22] Filed: Nov. 15, 1994

[51] Int. Cl.⁶ .................................................. H01S 3/04
[52] U.S. Cl. .......................... 372/35; 372/92; 372/61
[58] Field of Search ......................... 372/34, 35, 92, 372/61

[56] References Cited

U.S. PATENT DOCUMENTS

| | | | |
|---|---|---|---|
| 3,665,337 | 5/1972 | Koechner | 372/35 |
| 4,011,522 | 3/1977 | Falk | 372/35 |
| 4,567,597 | 1/1986 | Mandella | 372/61 |
| 4,740,983 | 4/1988 | Azad | 372/92 |

*Primary Examiner*—Leon Scott, Jr.
*Attorney, Agent, or Firm*—Georgann S. Grunebach; Michael W. Sales; Wanda K. Denson-Low

[57] ABSTRACT

The impingement cooled laser apparatus including a laser rod (12) that is surrounded by an inner sleeve (24) and an outer sleeve (28). The space between the inner and outer sleeves (24, 28) forms a fluid channel. Coolant is introduced via input ports (32) and fills the fluid channel between the two sleeves. There are evenly distributed small jet holes (38) through the inner sleeve (24) to allow the coolant to spray through to the laser rod (12). After the coolant has impinged perpendicularly on the laser rod (12), it is drawn off through coolant outlet ports (36).

8 Claims, 2 Drawing Sheets

METHOD AND STRUCTURE FOR IMPINGEMENT COOLING A LASER ROD

FIELD OF THE INVENTION

The present invention relates to a solid state laser apparatus, and more particularly to a solid state laser apparatus incorporating a laser rod and wherein cooling fluid is applied to the laser rod in a radial direction perpendicular to the laser rod axis in such a manner to effectively dissipate excess heat energy.

BACKGROUND OF THE INVENTION

Solid state laser apparatus incorporate laser rods within a cavity as the active lasing medium. The laser rods receive pumping energy, for example from diode arrays, and are subject to heat build up. One of the primary design considerations of a solid state laser is how to cool the laser rod. The more effectively that the cooling can be accomplished, the more power that can be generated by the laser.

In presently known technology, in order to cool the laser rod, a cooling fluid is contained in a reservoir which is located around the laser rod. It is desirable to maximize the cooling effect between the laser rod and the cooling fluid. The prior technique to accomplish this is to provide a maximum outer periphery of the laser rod. Since the outer periphery cannot be increased much past standard configurations without affecting operation of the laser, the maximum cooling efficiency of the laser rods cannot be increased extensively past values using presently available laser techniques and laser rod/cooling flow configurations.

Present techniques of cooling the rod consist of applying the coolant liquid over the surface of the rod so that it flows in a direction parallel to the longitudinal axis of the rod. This cooling technique is referred to as axial flow cooling.

One known technique which provides for effective pumping of lasers is to encase the laser rod within a material which is transparent to the photonic radiation which is being used to pump the laser rod. This laser configuration is illustrated in U.S. Pat. No. 4,969,155 entitled "Integrating Laser Diode Pumped Laser Application", which issued on Nov. 6, 1990 to O. Kahan. In FIG. 3 of the Kahan patent an apparatus is shown wherein cooling fluid with axial flow is used to surround the laser rod.

SUMMARY OF THE INVENTION

An object of the present invention is to provide a cooling mechanism for a laser rod for a laser which provide highly efficient cooling.

Another object of the present invention is to provide a cooling system for a solid state laser that does not interfere with the ability to pump the laser rod.

Still another object of the present invention is to provide a radial cooling system for a laser rod wherein cooling fluid impinges the rod perpendicular to the longitudinal axis of the rod.

A further object of the present invention is to provide a radial cooling system for a laser rod wherein the temperature difference between the laser rod and the cooling fluid is made as small as possible.

BRIEF DESCRIPTION OF THE DRAWINGS

The above set forth and other features of the invention are made more apparent in the following Detailed Description of the Invention when read in conjunction with the attached Drawings, wherein.

DETAILED DESCRIPTION OF THE INVENTION

Figure 1:
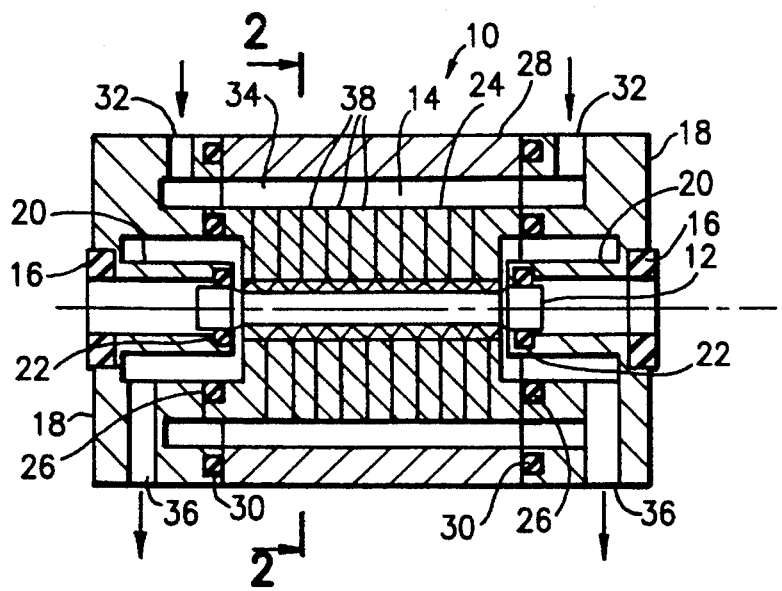
FIG. 1 is a side cross sectional view of one embodiment of a cooling system for a laser rod of a solid state laser according to the present invention.

The laser rods serving as the pumped active medium in solid state lasers dissipate high power densities. Thus, the temperature of the laser rod must be maintained at relatively low temperature levels to produce efficient lasing action. The typical laser rod has a substantially circular cross section and is usually made of solid YAG material. A measure of the efficiency of forced convection cooling is a parameter called heat transfer coefficient. The coefficient is represented by H and is expressed in the following English units; BTU/Hr-Ft$^2$-°F. The temperature difference between the surface of the rod and the liquid is expressed as follows:

$$\Delta T = q/H \qquad (1)$$

where $\Delta T$ is the temperature difference between the liquid and the laser rod.

q is the power dissipated per unit area in BTU/Hr-Ft$^2$

H is the heat transfer coefficient

For most efficient laser operation, the temperature difference $\Delta t$ should be as small as possible.

The above expression implies that the higher H results in a lower temperature difference $\Delta t$ between the rod surface and the coolant.

The laser rod dissipated power per unit area in a typical embodiment is 100 Watts/Cm$^2$ or 317,100 BTU/Hr-Ft$^2$. To achieve the target laser efficiency the temperature difference $\Delta t$ between the fluid and the laser rod must be no greater than 10° C. A heat removal value of 17,617 BTU/hour is required to meet this temperature difference limit.

Calculations indicate that this value is very difficult to achieve with axial flow cooling (due to the stratified temperatures) without exceedingly high coolant velocities which are not practical. To achieve such high coolant velocities it is necessary to either substantially increase the flow rate or substantially reduce the flow cross-sectional area. Reducing the flow cross-sectional area means making the space between the rod and the sleeve very small. This is not desirable because the pressure drop becomes very sensitive to slight changes in dimensions which can be affected by mechanical tolerances that are inherent in the design. The drastic increases in pressure drop coupled with the dimensional tolerances of the flow area can result in non-uniform cooling. Increases the flow rate to a practical coolant flow velocity which can be achieved in axial flow cooling will not yield a high enough heat removal rate H.

The present invention provides an improved cooling system for the laser rod which is referred to as impingement cooling. Impingement cooling of the laser rod eliminates the problems associated with axial flow because in the present invention the coolant is directed substantially perpendicular to the surface of the rod with many jets of fluid uniformly distributed along the rod. The uniformity of cooling is unaffected by pressure drop because the pressure drop through the jet nozzles, where most of the pressure drop takes place and which is influenced by the jet hole diameter, are all equal. This allows the use of high coolant velocities impinging on the rod surface without the resultant pressure drop sensitivity encountered in axial flow cooling. Analytical predictions made which correlated well with test data, indicated that high H values that are two to four times that of axial flow, can be obtained with radial impingement cooling. With such improvement in the cooling efficiency maximum temperature difference $\Delta T$ values of 10° C. or less can be achieved.

The invention described herein is a technique for cooling solid state laser rods that dissipate high power densities (high power per unit area) and whose operating temperatures must be maintained at relatively low levels in order to achieve the required efficiency. The invention employs impingement cooling, wherein an array of coolant fluid jets or streams are directed onto the heated surface of the laser rod. The coolant employed is typically liquid, such as methanol, that has suitable optical characteristics and which will neither freeze nor boil over the specified operating temperature range.

Figure 2:
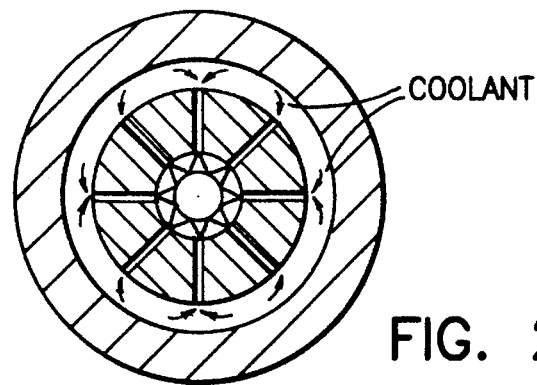
FIG. 2 is a sectional end view taken along section lines A—A of FIG. 1.

Referring now to the drawings, FIGS. 1 and 2 illustrate side and end views, respectively, of a portion 10 of a laser apparatus referred to as a laser pump head. The laser apparatus portion 10 comprises an elongated substantially cylindrical laser rod 12 which may be comprised of neodymium-doped yttrium aluminum garnet ($Nd^{+3}YAG$), for example. The laser rod 12 is disposed in a cavity 14. The laser rod 12 is secured at either longitudinal end by a rod retainer 16. Each rod retainer 16 is secured within respective thermally conductive end manifolds 18.

A seal sleeve 20 provides a seal between each end manifold 18 and the respective rod retainer 16. A pair of rod O-rings 22 provides a seal between the laser rod and each rod retainer 16. An inner sleeve 24, within which the cavity is formed, for example, of a sapphire crystal 16 and is maintained by O-rings 26.

A coolant inlet port 32 extends through each of the thermally conductive end manifolds 18, and is in communication with an annular fluid channel 34 between inner and outer sleeves 24 and 28. A coolant as indicated by the arrows is introduced through each coolant inlet port 32. Coolant outlet ports 36 extends through each of the end manifolds 18 and are connected with the cavity 14.

A plurality of radially extending apertures 38, referred to as jet holes, radially extend relative to the laser rod 12 through inner sleeve 24 between the annular fluid channel 34 and the cavity 14 as illustrated in FIGS. 1 and 2. Coolant fluid enters fluid channel 34 through input ports 32 and passes through the radial apertures 38 into the laser cavity 14. The radially extending apertures 38 act as small jet holes which extend through the inner sleeve 24 to allow the coolant to spray through to an impinge on the laser rod 12. After the coolant has impinged on the laser rod 12 it is drawn off both ends through the end manifolds 18 to the coolant outlets 36. It is important to note that the coolant fluid is applied to the laser rod 12 in a substantially radial direction perpendicular to laser rod 12 in this invention, as compared to the prior art which applied the fluid in a substantially axial direction.

Providing radial impingement of the coolant fluid on to the laser rod 12 provides an enhanced cooling compared to the axial flow technique of the prior art. The fluid entering in a radial direction tends to have an increased turbulent flow compared to axial flow cooling liquid laser pump heads. Turbulent flow provides an increased heat transfer rate compared to laminar flow. In turbulent radial impingement cooling devices according to the present invention, the boundary layer is smaller, thereby producing a smaller temperature difference between the coolant and the laser rod ($\Delta t$).

The present invention makes it possible to provide high efficiency cooling of high power density solid state laser apparatus that is relatively simple to implement and which can be achieved with relatively low coolant flow rates and with reasonable coolant supply pressures. For a given type of coolant flow rate, supply temperature and supply pressure, impingement cooling is much more efficient (two times or better) than present methods of cooling these types of laser rods. Furthermore impingement cooling eliminates other problems associated with present methods of cooling, such as sensitivity to pressure drop and non-uniformity of cooling.

One of the difficult problems to solve in the design of the high power density lasers is how to remove the heat effectively and to maintain a relatively low rod operating temperature. This invention substantially improves the cooling efficiency which is turn makes it more feasible to design solid state lasers with higher powers occupying very limited volumes. Commercial material processing lasers for welding, drilling and cutting as well as laser plasma sources for x-ray lithography could potentially benefit from this invention. The cooling concept embodied in this invention could also be applied to laser lamp cooling flashlamp pumped laser apparatus.

The actual heat transfer coefficient (H) is determined not only by the coolant flow rate, but by the diameter of the radially extending apertures 38, the number of apertures 38 used, the spacing between adjacent apertures 38 and the distance between the surface of laser rod 12 and the apertures 38 at the inner surface of the inner sleeve 24. For a given laser apparatus size and performance requirements, the optimum configuration that yields the highest H value can be calculated.

Figure 3:
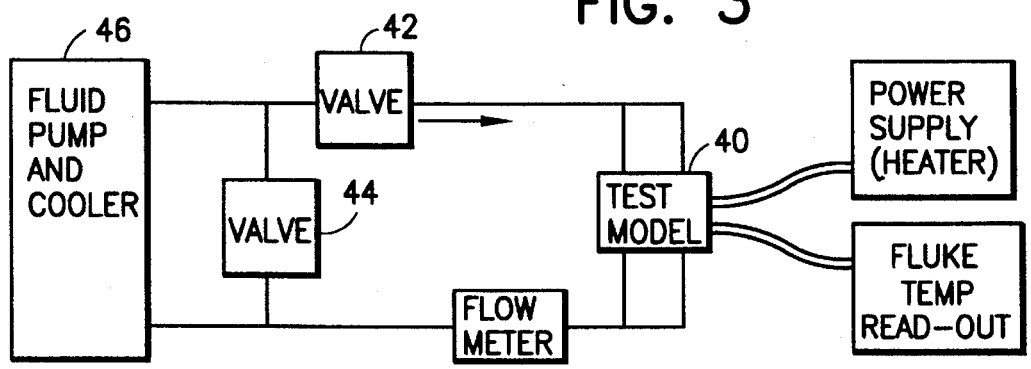
FIG. 3 is a schematic diagram of a test setup used to test the laser of FIG. 1.

Using the test setup of FIG. 3, the equivalent of a laser rod was used as test model 40 and was able to generate up to 52 watts/$cm_2$ of power density or 52 percent of the power density of a laser rod. The test unit also contained an array of 70 0.015 inch diameter apertures evenly distributed over the entire heated surface area to provide radial coolant flow. A 32 percent by weight ethylene glycol/water solution was used as the coolant that was pumped through valves 42 and 44 by fluid pump and cooler 46.

Figure 4:
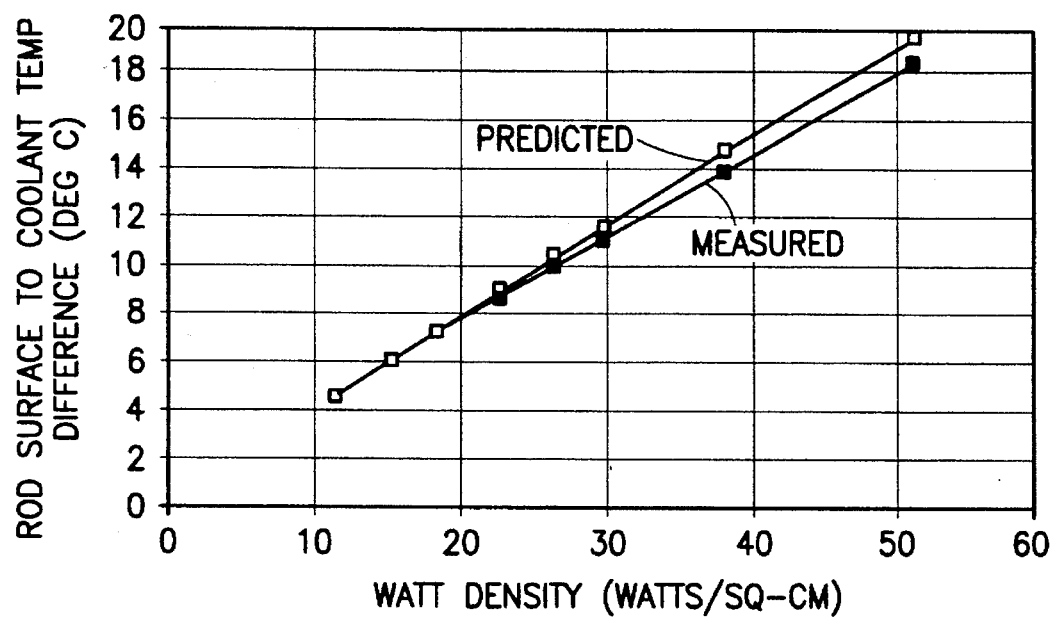
FIG. 4 is a plot of predicted vs. measured difference in temperature, of the FIG. 3 test setup, between the laser rod and the liquid coolant as a function of watt density for a coolant flow rate of 0.89 gallons/min.
Figure 5:
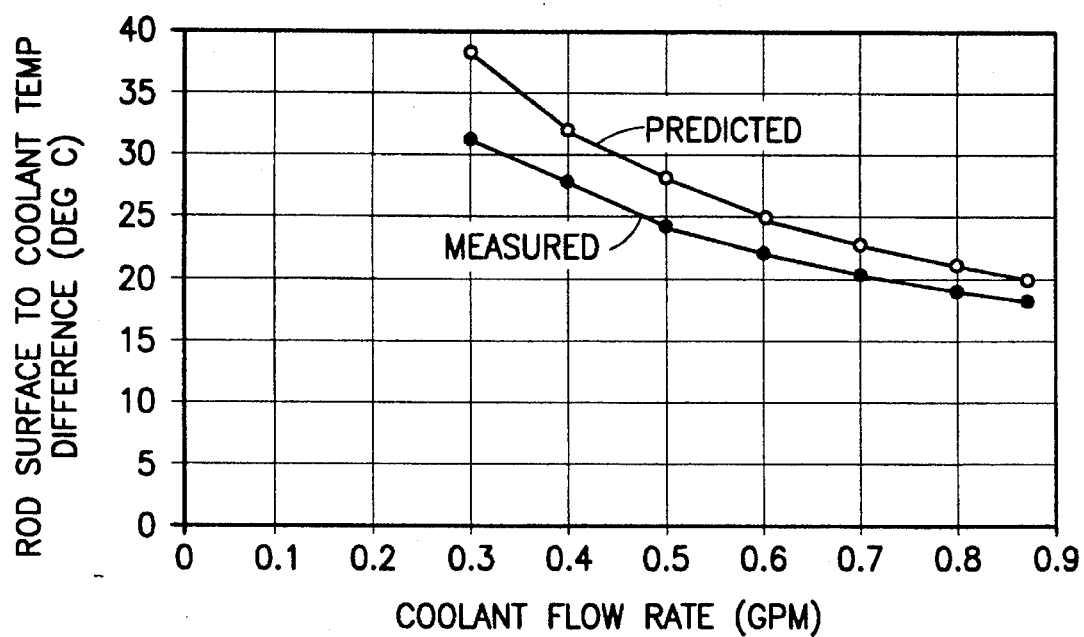
FIG. 5 is a plot of predicted vs. measured difference between rod surface temperature and coolant temperature, for various coolant flow rates, and a constant power density of 52 watts/cm$^2$.

Test data were obtained for various coolant flow rates and various power densities. The predicted H values and measured H values that were reduced from measured temperature data for a power density of 52 watts/$cm^2$ and for various coolant flow rates, are compared in the following TABLE 1. A plot of predicted versus measured $\Delta T$ as a function of watt density for a coolant flow rate of 0.89 GPM is shown in FIG. 4. FIG. 5 shows the predicted and measured rod surface temperature to coolant temperature difference for various coolant flow rates and a constant power density of 52 watts/$cm^2$.

The data in FIGS. 4 and 5 indicate that the actual cooling efficiency of impingement cooling of the present invention meets or exceeds performance expectations as illustrated in TABLE 1.

TABLE 1

PREDICTED vs. MEASURED FORCED CONVECTION
HEAT TRANSFER COEFFICIENT
(Power Density is Constant at 52 Watts/cm$^2$)

| Coolant Flow Rate (GPM) | Heat Transfer Coefficient (Btu/Hr-Ft$^2$ °F.) | |
|---|---|---|
| | Predicted | Measured |
| 0.3 | 2604 | 3188 |
| 0.4 | 3155 | 3633 |
| 0.5 | 3661 | 4219 |
| 0.6 | 4134 | 4679 |
| 0.7 | 4581 | 5091 |
| 0.8 | 5009 | 5550 |
| 0.89 | 5378 | 5788 |

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A cooling structure for a laser rod having a longitudinal axis and contained within a pumped laser apparatus comprising;

an annular channel disposed radially around said laser rod, said laser rod operating at a known temperature and at a high power density; and a means for cooling disposed between said annular channel and said laser rod, said means for cooling including at least one jet aperture radially extending from said laser rod to permit fluid to pass from said annular channel said fluid impinging substantially normal and in a radial directions onto said laser rod said fluid having a lower temperature than the known operating temperature of said laser, said impingement thereby reducing temperature differential between said rod and said fluid, to thereby increase the cooling efficiency of said laser.

2. A cooling structure for a laser rod according to claim 1 wherein said means disposed between said annular channel and said laser rod includes an annular inner sleeve element disposed around said laser rod and co-linear with said longitudinal axis of said laser rod, said inner sleeve containing at least one radically spaced aperture through said inner sleeve from an exterior surface of said inner sleeve to an inner surface of said inner sleeve and substantially normal to said longitudinal axis of said laser rod, and wherein said cooling structure further includes an annular outer sleeve element disposed around said inner sleeve element co-linear with said laser rod and said inner sleeve, said outer sleeve having an interior surface spaced at a selected radial distance from said exterior surface of said inner sleeve wherein said spaced inner and outer sleeves form said annular channel.

3. A cooling structure according to claim 2 wherein said annular inner sleeve contains a plurality of spaced radial apertures disposed along its length.

4. A cooling structure according to claim 3 further comprising at least one output port disposed in said inner sleeve for removing said cooling fluid from the region between the interior of said inner sleeve and said laser rod.

5. A cooling structure according to claim 2 further comprising at least one input port disposed in said outer sleeve for introducing cooling fluid into said channel between said inner and outer annular sleeves whereby said cooling fluid in said channel flows through said at least one aperture in said inner sleeve to impinge on said laser rod substantially normal to said longitudinal axis of said laser rod.

6. A method for cooling a laser rod, having a longitudinal axis and contained within a pumped laser apparatus comprising the steps of:

providing a supply of cooling fluid in a fluid channel in said laser apparatus, directing said fluid from said channel through a sleeve member having at least one aperture, which extends substantially radially with respect to said laser rod whereby said cooling fluid is directed out of said aperture and impinges said laser rod in a direction normal to said longitudinal axis.

7. The cooling method as described in claim 6 further comprising the step of:

containing the cooling fluid after it impinges said laser rod.

8. The cooling method as described in claim 7, wherein at least a portion of the contained fluid flows in a turbulent manner.

* * * * *